June 5, 1956  J. IRTENKAUF  2,748,643
SPEED CHANGE TRANSMISSION, ESPECIALLY FOR TOOL MACHINES
AND MORE PARTICULARLY A FEED TRANSMISSION OF A LATHE
Filed May 1, 1951                                    8 Sheets-Sheet 5

Inventor:
Josef Irtenkauf
BY
ATTORNEY

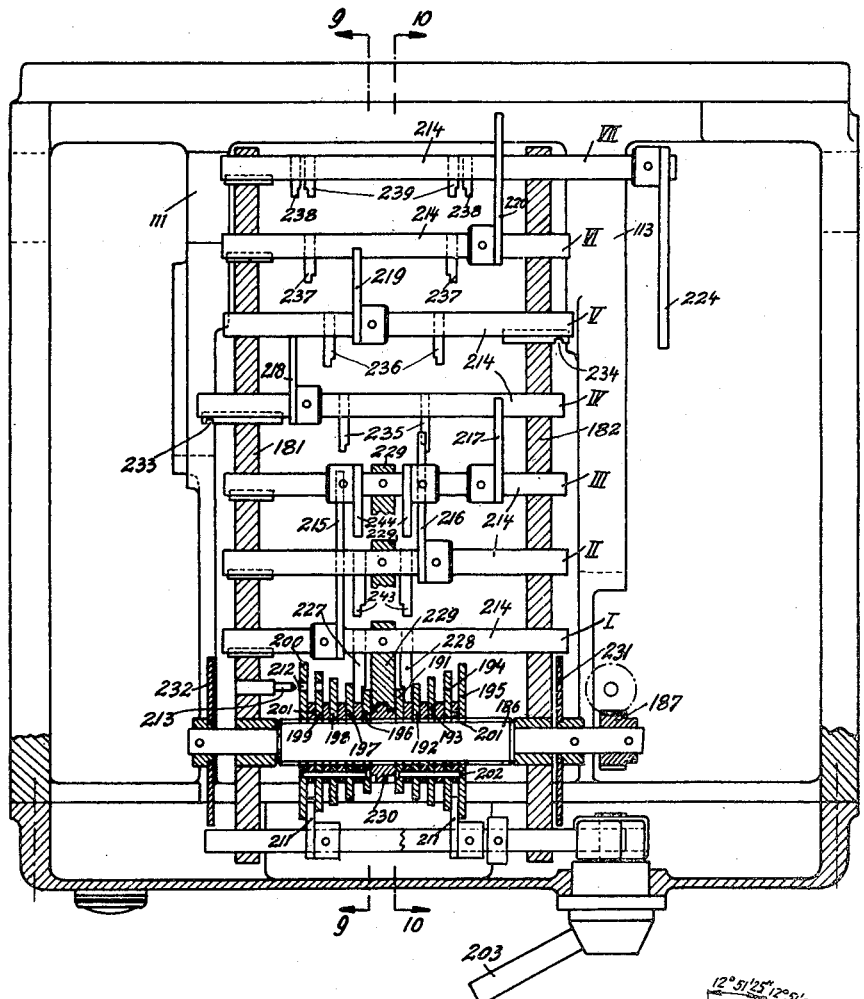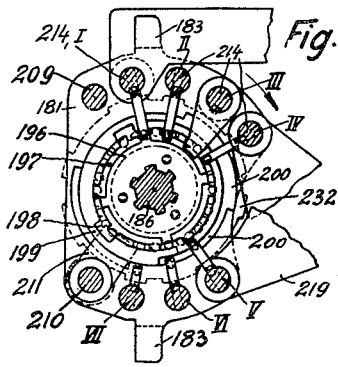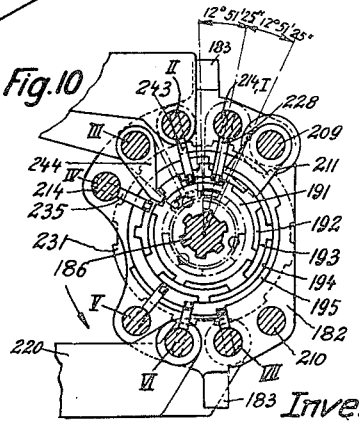

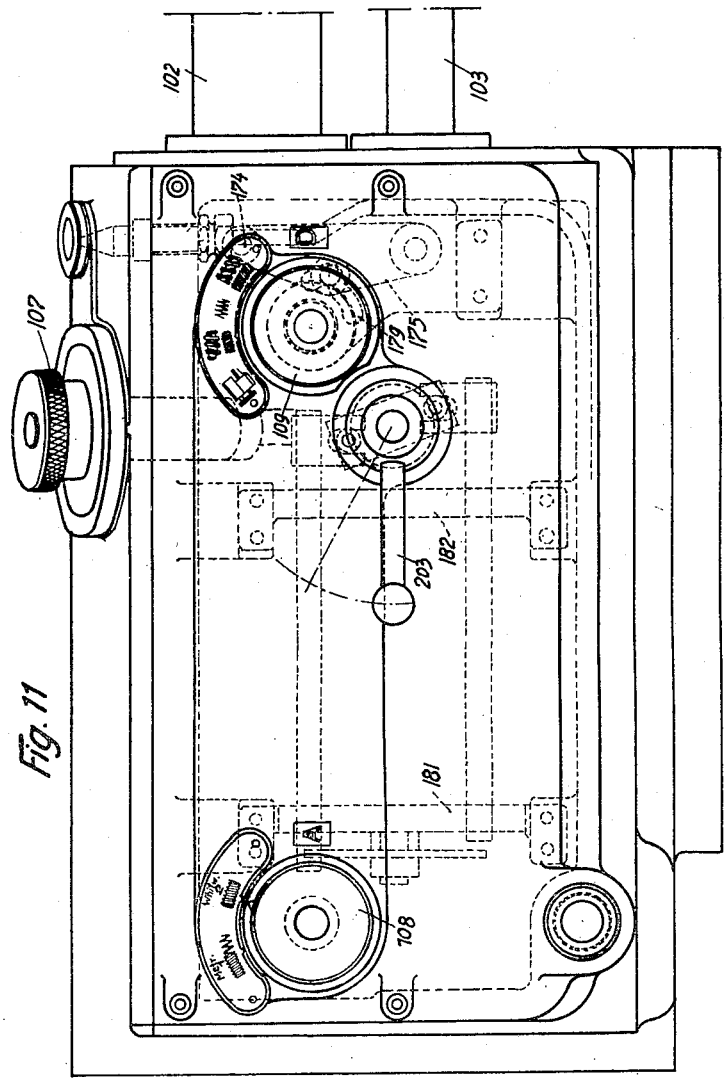

Fig. 12

| Serial Number | 240 ||||| 241 ||||| Basic Train ||| Supplemental Train || Multiplier Train || mm Pitch | Turns per 1" |
|---|---|---|---|---|---|---|---|---|---|---|---|---|---|---|---|---|---|
| | 7 | 6 | 5 | 4 | 1/2/3 | 1/2/3 | 4 | 5 | 6 | 7 | 1 | 2 | 3 | 4 | 5 | 6 | 7 |
| 1 | | | | 1 | 1 | | | | | | 8:12 | | | | 49:56 | 1:4 / 1:2 | 0,5 | 56 |
| 2 | | | | | 1 | 1 | | | | | 9:12 | | | 49:54 | | | - | 48 |
| 3 | | | | | 2 | | 2 | | | | | 10:12 | | 49:55 | | | 0,625 | 44 |
| 4 | | | | | 2 | | 2 | | | | | 11:12 | | 49:55 | | | - | 40 |
| 5 | | | | | 3 | | | 3 | | | | | 12:12 | | 49:57 | | 0,75 | 38 |
| 6 | | | | | 3 | | | 3 | | | | | 12:12 | 49:54 | | | - | 36 |
| 7 | | 1 | | | | | | | 3 | | | | 14:12 | | 49:56 | | 0,875 | 32 |
| 8 | 1 | | 1 | | | | | | | | 8:12 | | | | 49:56 | 1:1 | 1 | 28 |
| 9 | 1 | | | 1 | | | | | | | 9:12 | | | 49:54 | | | 1,125 | 24 |
| 10 | 1 | | | | 2 | | | | | | | 10:12 | | 49:55 | | | 1,25 | 22 |
| 11 | 1 | | | | 2 | | | | | | | 11:12 | | 49:55 | | | 1,375 | 20 |
| 12 | 1 | | | | 3 | | | | | | | | 12:12 | | 49:57 | | 1,5 | 19 |
| 13 | 1 | | | | 3 | | | | | | | | 12:12 | 49:54 | | | - | 18 |
| 14 | 1 | | 1 | | | | | | 3 | | | | 14:12 | | 49:56 | | 1,75 | 16 |
| 15 | 1 | 1 | | | | | | | | | 8:12 | | | | 49:56 | 1:2 | 2 | 14 |
| 16 | | 1 | | 1 | | | | | | | 9:12 | | | 49:54 | | | 2,25 | 12 |
| 17 | | 1 | | | 2 | | | | | | | 10:12 | | 49:55 | | | 2,5 | 11 |
| 18 | | 1 | | | 2 | | | | | | | 11:12 | | 49:55 | | | 2,75 | 10 |
| 19 | | 1 | | | 3 | | | | | | | | 12:12 | | 49:57 | | 3 | 9½ |
| 20 | | 1 | | | 3 | | | | | | | | 12:12 | 49:54 | | | - | 9 |
| 21 | | 1 | 1 | | | | | | 3 | | | | 14:12 | | 49:56 | 1:1 | 3,5 | 8 |
| 22 | 1 | 1 | | 1 | | | | | | | 8:12 | | | | 49:56 | | 4 | 7 |
| 23 | 1 | 1 | | | 1 | | | | | | 9:12 | | | 49:54 | | | 4,5 | 6 |
| 24 | 1 | 1 | | | 2 | | | | | | | 10:12 | | 49:55 | | | 5 | 5½ |
| 25 | 1 | 1 | | | 2 | | | | | | | 11:12 | | 49:55 | | | 5,5 | 5 |
| 26 | 1 | 1 | | | 3 | | | | | | | | 12:12 | | 49:57 | | 6 | 4¾ |
| 27 | 1 | 1 | | | 3 | | | | | | | | 12:12 | 49:54 | | | - | 4½ |
| 28 | 1 | 1 | | | | | | | 3 | | | | 14:12 | | 49:56 | | 7 | 4 |

Inventor:
Josef Irtenkauf

United States Patent Office

2,748,643
Patented June 5, 1956

2,748,643

SPEED CHANGE TRANSMISSION, ESPECIALLY FOR TOOL MACHINES AND MORE PARTICULARLY A FEED TRANSMISSION OF A LATHE

Josef Irtenkauf, Goppingen, Wurttemberg, Germany, assignor to Gebr. Boehringer G. m. b. H., Goppingen, Wurttemberg, Germany, a limited liability company of Germany Application May 1, 1951, Serial No. 223,882

9 Claims. (Cl. 82—21)

My invention relates to a speed change transmission, especially for tool machines and, more particularly, to a feed transmission of a lathe.

It is an object of my invention to equip a speed change transmission including shiftable gears or other individually shiftable members with a rotatable and shiftable drum for the purpose of preselecting the ratio of transmission by an appropriate rotary adjustment of the drum and for the purpose of subsequently performing the gear shifting operation by an axial movement of the drum, the latter being provided with suitable means which upon axial movement of the drum will act on and shift the individually shiftable gears of the transmission in various combinations.

In a prior transmission of that type such as disclosed in the German Patent No. 559,326, no precautions are taken to lock the shiftable gears that are to be kept in their neutral positions. Hence, under the influence of oscillations as are liable to be set up in a lathe or other machine in operation, the shiftable gears may inadvertently leave their neutral positions and cause serious trouble. It is an object of my invention to afford a speed change transmission including a rotary drum for preselecting a speed and for performing the gear shifting operation in which the members not to be shifted are securely locked to thereby insure reliability in operation. I attain this object by composing the rotary drum of a nonshiftable part and of two axially shiftable parts, the nonshiftable part serving to lock the shiftable gears or other members which are to be kept in neutral positions.

My invention is primarily applicable to the feed transmission of a lathe equipped with a lead screw and a feed rod. When a transmission of that type is combined with a train of gears adapted to be disabled or enabled depending on whether the lead screw shall be used to cut threads of the metric system or threads of the English system, the provision of the novel speed preselecting drum will considerably facilitate the operation of setting up the lathe for the proper work. It is another object of my invention to further facilitate such work in a lathe where a reversing gear is provided for the lead screw and where means must be provided to connect either the lead screw or the feed rod to the feed transmission. This object is attained, according to my invention, by the provision of a single handle settable to any one of four positions, such handle being operative in the first position to directly connect the lead screw to the primary shaft of the transmission, in the second position to render the reversing gear operative for the cutting of left hand threads, in a third position to disconnect the lead screw and to connect the feed rod to the feed transmission, and in a fourth position to connect the lead screw to the feed transmission for the cutting of right hand threads. A further object of my invention is the provision of a simple and accurate feed transmission for the cutting of either threads of the metric system or threads of the English system at the option of the operator, such transmission having a high efficiency. Prior transmissions of that type invariably included a cone gear assembly involving the disadvantage that in certain setups a larger gear drives a smaller gear thereby increasing the rotary speed. Such increase invariably involves high stresses in the bearings of the shafts and a consequent friction reducing the efficiency. It is an object of my invention to afford a feed transmission for the optional cutting of threads of the metric system or of the English system in which any one of the gears drives a gear of the same number of teeth or of a higher number of teeth thereby avoiding any increase of the rotary speeds.

Further objects of my invention will appear from the description of a preferred embodiment following hereinafter and the features of novelty will be pointed out in the claims.

In the accompanying drawings:

Fig. 8 is a developed axial sectional view of the transmission showing the shifting drum and the shifting rods associated therewith;

Fig. 9 is a cross section of the shifting drum taken along the line 9—9 of Fig. 8;

Fig. 10 is the section through the shifting drum taken along the line 10—10 of Fig. 8;

Fig. 11 is an elevation similar to that of Fig. 1 of the feed change box on an enlarged scale; and Fig. 12 is a table illustrating the various setups of the transmission.

Figure 1:
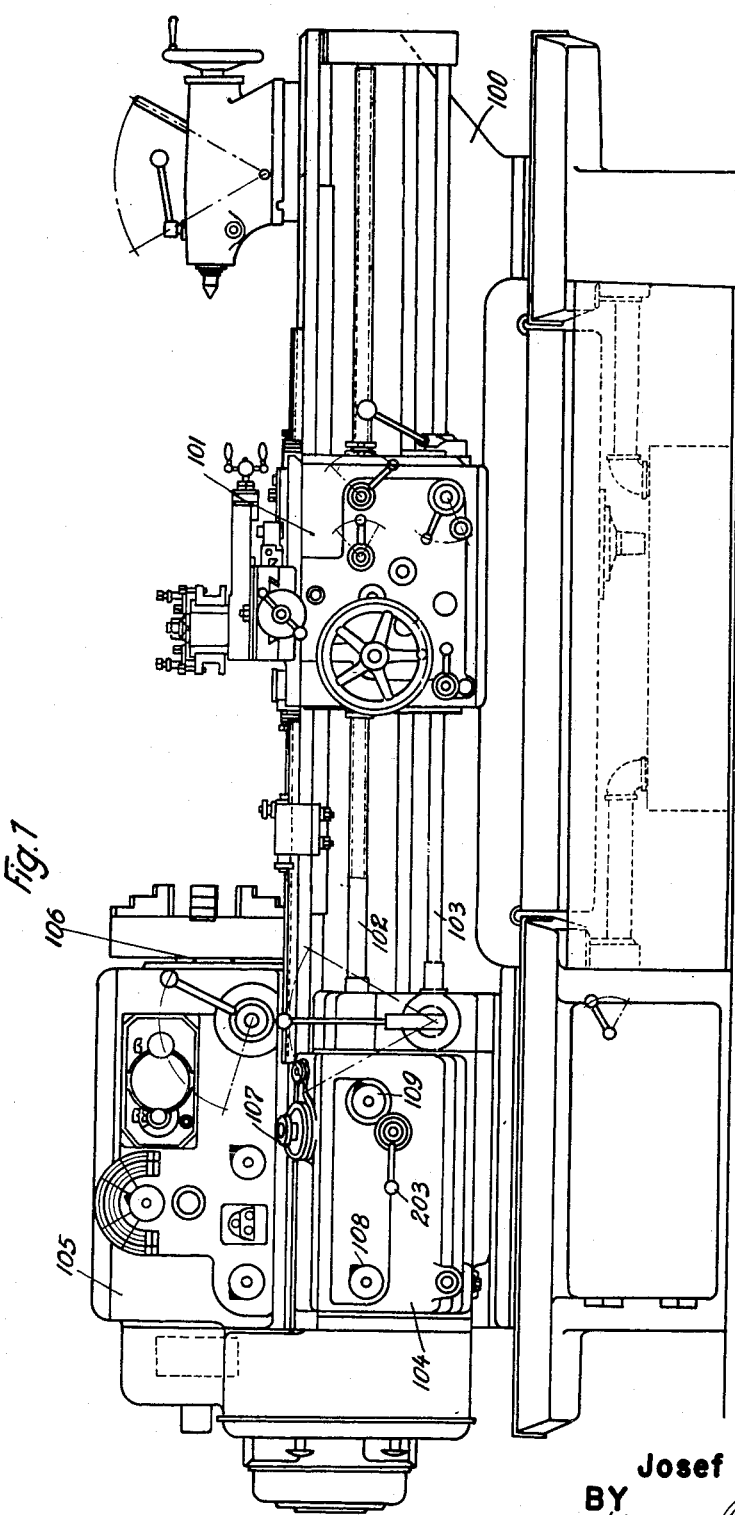
Fig. 1 is an elevation of a lathe equipped with my novel feed transmission.

The lathe illustrated in Fig. 1 is comprised of a bed 100 affording a horizontal guide path for a longitudinal slide 101 which is driven either by a lead screw 102 or by a feed rod 103 adapted to be actuated by my novel feed transmission encased in a gear box 104 mounted on the bed 100. The feed transmission is driven in a known manner from the headstock transmission through suitable speed change gears, such as gear 116, Fig. 2, and, if desired, through a belt drive, such headstock transmission being encased in the headstock 105 and adapted to drive the work spindle 106.

On the top of the gear box 104 a rotatable knob 107 is mounted capable of assuming any one of twenty-eight different angular positions and serving the purpose to preselect the desired ratio of transmission for the actuation of the lead screw 102 or of the feed rod 103. If the operator desires, for instance, to cut a thread of the English system having twenty-two threads per inch, the rotatable knob 107 must be turned to its position #10 as will appear from the table shown in Fig. 12 indicating at its left the serial number correlated to the angular positions of the knob and indicating at the right the associated pitch of the thread.

With the same setup of the knob to position #10 the operator may also cut a thread of the metric system having a pitch of 1.25 millimeters. Whether any particular setup of knob 107 results in a thread of the metric system or in a thread of the English system depends on the setting of another rotatable knob 108 capable of assuming either one of two positions.

Finally, a rotatable knob 109 is mounted on the front of the gear box 104 capable of assuming any one of four different positions and adapted to determine various conditions of operation including the direction of rotation of the lead screw 102 and the alternative connection with the feed transmission of either the lead screw or the feed rod. Thus, the operator may, depending on the adjustment of knob 109, cut either left hand threads or right hand threads or he may disconnect the lead screw altogether and use the feed rod for ordinary lathe work. With a fourth adjustment of knob 109 the lead screw may be rigidly connected with the driving shaft of the feed transmission carrying the change gear 116, Fig. 2, as is desirable where the ratio of transmission is to be determined by the change gears interposed in a known manner between the work spindle 106 and the feed transmission.

Figure 2:
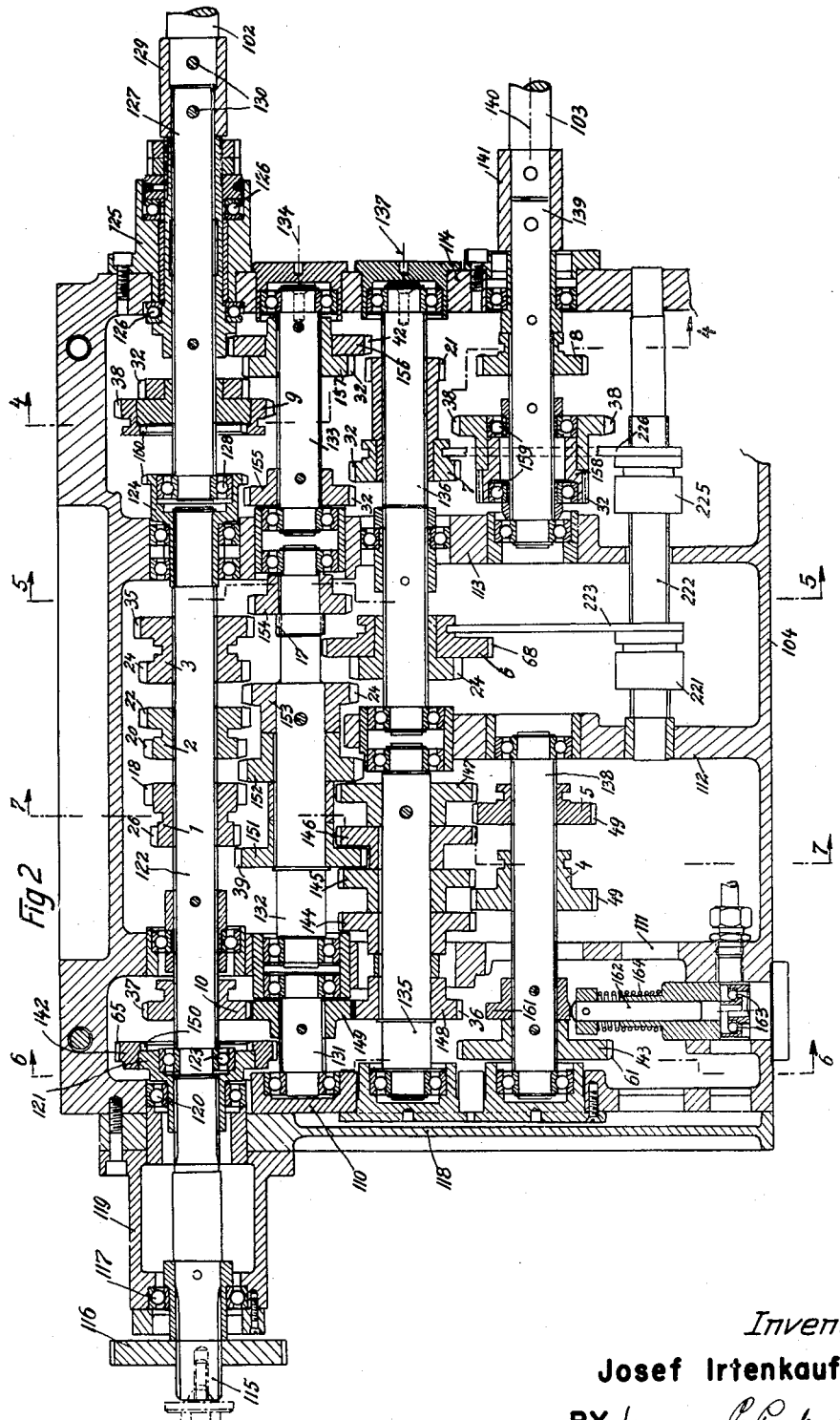
Fig. 2 is a section through the feed transmission taken along the line 2—2 of Fig. 3.

The design of the feed transmission encased in box 104 will now be described. In the left hand end wall 110, in transverse walls 111, 112, 113 and in the right hand end wall 114, Fig. 2, a number of transmission shafts is journalled in suitable bearings, such shafts carrying gears fixed thereto and gears splined thereon to be shiftable. The number of teeth of such gears is indicated in Fig. 2 by the numbers from 11 to 99. Thus it is to be understood that such numbers 11 to 99 do not represent reference numerals, but are intended to more clearly disclose the particular embodiment of my invention.

The drive shaft 115 projecting out of the gear box and carrying on its projecting end the change gear 116 fixed thereto for operation by other change gears driven from an outgoing shaft of the headstock transmission, is journalled by means of anti-friction bearings 117 in a suitable bushing 119 attached to a cover plate 118 fixed to the gear box 104. On the other end of the shaft 115 there is attached a bell-shaped member 121 journalled in the wall 110 by means of an anti-friction bearing 120.

Co-axially to shaft 115 there is journalled a shaft 122 in the partition walls 111, 112 and 113 by means of ball bearings, such shaft 122 being supported within the bell-shaped member 121 by a ball bearing 123 and carrying on its other end a bell-shaped member 124. Co-axially to shaft 122 there is journalled in the wall 114 and in a bushing 125 bolted thereto by means of an ordinary bearing and by means of two thrust ball bearings 126 a shaft 127, the left hand end of said shaft 127 being supported in the bell-shaped member 124 by means of a ball bearing 128 and the right hand end of said shaft 127 being connected with the lead screw 102 by means of a bushing 129 and transverse pins 130.

Figure 3:
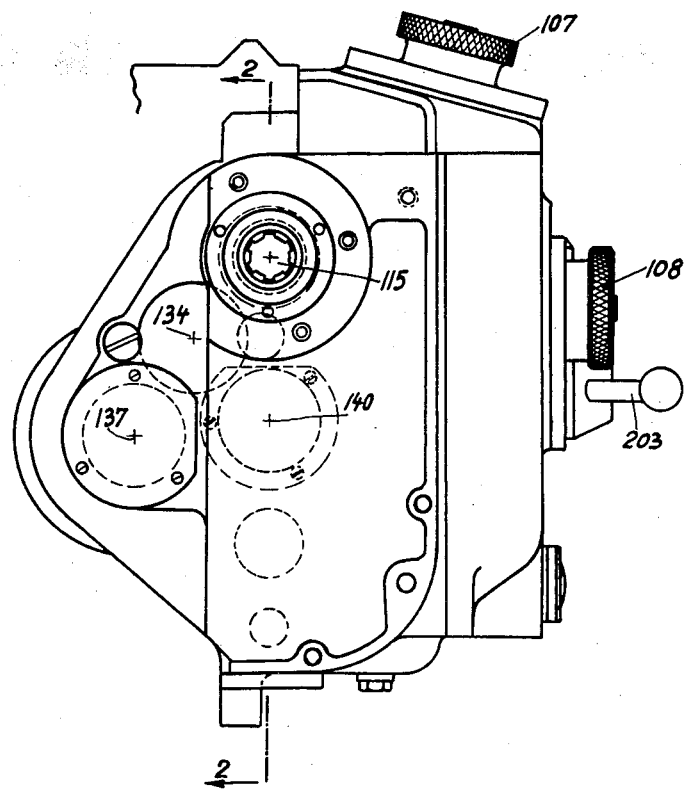
Fig. 3 is an end view of the feed transmission box viewed from the left with reference to Fig. 2.

In the walls 110, 111, 112, 113, and 114 co-axially disposed shafts 131, 132 and 133 are journalled extending parallel to the shafts 115, 122 and 127. The axes of such shafts 131, 132 and 133 are indicated at 134 in Fig. 3. A third train of shafts comprising co-axial shafts 135 and 136 has an axis 137, Fig. 3, whereas beneath the train of shafts 115, 122, 127 and at about the level of the axis 137 two co-axial shafts 138 and 139 are journalled having a common axis indicated at 140 in Fig. 3. The shaft 139 projects out of the end wall 114 and is clutched to the feed rod 103 by means of a sleeve 141 and suitable transverse pins.

The bell-shaped member 121 constitutes a gear 142 having sixty-five teeth, such gear meshing with a gear 143 fixed to the splined shaft 138 and having sixty-one teeth. Slidable gears 4 and 5 are mounted on the splined shaft 138 to be rotatable therewith, same being shown in their intermediate idle position. The slidable gears 4 and 5 are adapted to be shifted to the right or to the left to be thereby selectively engaged with gears 144, 145, 146, and 147 respectively, fixed to the shaft 135. This shaft 135 carries a gear 148 fixed thereto having thirty-six teeth and adapted by means of a transfer gear 149 on shaft 131 to drive a slidable gear 10 splined on shaft 122. The gear 10 has thirty-seven teeth. When shifted to the left it may engage internal teeth 150 of the gear 142. When that happens the shafts 115 and 122 will be clutched to one another, while at the same time the driving connection via gears 142, 143, 4 or 5, 144 to 147, 148, 149, and 10 will be interrupted between the two last mentioned gears 149 and 10. The direct connection of the shafts 115 and 122 by the clutch teeth 150 and the gear 10 serves the cutting of metric threads, whereas the described gear train interposed between the drive shaft 115 and the intermediate shaft 122 serves the purpose of cutting gears of the English system measured in inches. The considerations determining how the slide gears 4, 5 will be set up in that case will be described later.

Each of the slide gears 1 and 2 are compound gears composed of two individual gears. In Fig. 2 they are shown in their intermediate idle position from which they may be shifted one step to the right or one step to the left for engagement with gears 151, 152, 153, or 154 respectively fixed to the shaft 132. Adjacent to the gear 154 the shaft 132 carries a pinion having seventeen teeth. This pinion can be engaged by and drive a compound slide gear 6 splined on shaft 136 and provided with two individual gears having twenty-four teeth or sixty-eight teeth, respectively. By shifting the slide gear 6 to the right or to the left either the individual gear having sixty-eight teeth will engage the pinion or the gear having twenty-four teeth will engage gear 153 likewise provided with twenty-four teeth. Thus, either the ratio of 1:1 or that of 1:4 may be set up between the two shafts 132 and 136.

A compound slide gear 7 having two individual gears provided with thirty-two and twenty-one teeth, respectively, is splined on shaft 136. Depending on whether it is moved from the intermediate idle position shown one step to the right or one step to the left it will mesh with a gear 155 having thirty-two teeth or with a gear 156 having forty-two teeth, both fixed to shaft 133 and thus adapted to drive same at the ratio of either 1:1 or 1:2. On shaft 133 another gear 157 is fixed serving the purpose of actuating either the lead screw 102 or the feed rod 103.

The actuation of the lead screw 102 is effected in one or the other direction of rotation depending on the setting of a slide gear 9 splined on the shaft 127. In the position shown the slide gear 9 assumes an idle position in which it is out of driving connection with any of the other elements. When the slide gear 9, however, is shifted from the position shown towards the right, its gear having thirty-two teeth will be brought to engagement with a gear 157 of the same size. When the slide gear 9, however, is moved one step to the left, the lead screw will be actuated via the following train: The gear 155 on the shaft 133 drives a transfer gear 158 mounted by means of ball bearings 159 to be freely rotatable on the shaft 139. The transfer gear 158 is a compound gear composed of the individual gear having thirty-two teeth permanently meshing with the gear 155 and of another gear having thirty-eight teeth. The latter will then engage gear 9. As a result, the lead screw 102 will be actuated in a direction opposite to that obtained when driven by gear 157.

Finally, the slide gear 9 may be shifted two steps to the left being thereby disengaged from gear 158 and being clutched to the bell-shaped member 124 by means of the clutch teeth 160 thereof. When that happens shafts 122 and 127 are directly connected, thus affording a possibility of rigidly connecting the lead screw 102 with the drive shaft 115 and to determine the ratio of transmission exclusively by the speed change gears co-operating with the speed change gear 116.

The actuation of the feed rod 103 is performed by a slide gear 8 splined on shaft 139 and capable of assuming either one of two positions, one being an idle position and the other one shown in the drawings being a position in which the gear 108 meshes with the gear 157. Means to be described hereinafter operable by the knob 109 will move gear 8 to the operative position in mesh with gear 157 and will, at the same time, move slide gear 9 to the idle position shown. In this event, the speed change transmission will drive the feed rod 103 only, whereas the lead screw 102 is left idle.

A cam 161 is fixed to a shaft 138 which is permanently driven by the pair of gears 142, 143, such cam actuating the piston 162 of a lubricating pump equipped with ball valves 163. A spring 164 is operative to keep the piston in engagement with the cam 161. Having now described the feed change transmission, I shall now explain the means for shifting the slide gears 1 to 10.

Figure 6:
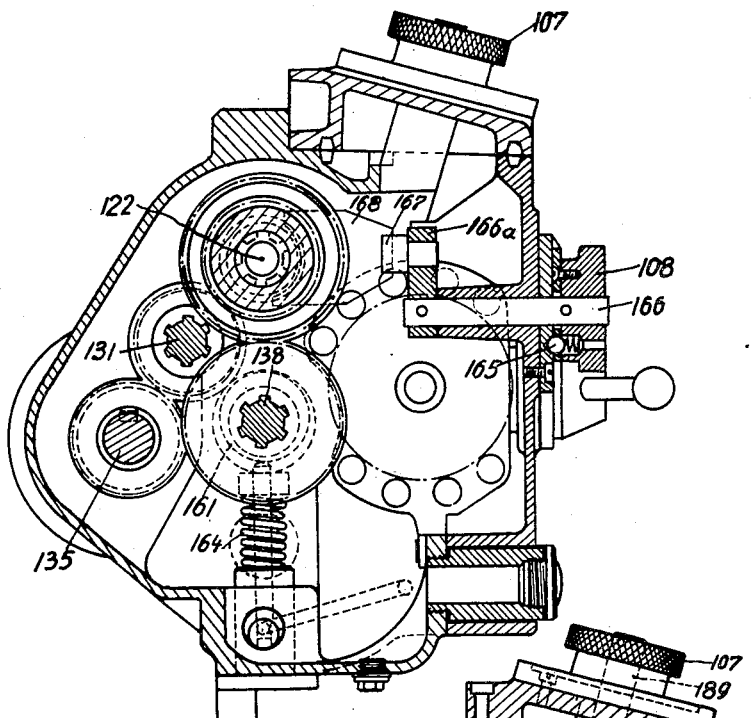
Fig. 6 is a section taken along the line 6—6 of Fig. 5.

The knob 108, Figs. 6 and 11, capable of assuming either one of two positions in which it is detained by a spring-actuated detent ball 165, is connected by its shaft 166 with a crank 166a for common rotation, the crank pin 167 fixed to said crank carrying a fork 168 engaging a peripheral groove of the slide gear 10. Hence, the slide gear 10 may be shifted by a turn of the knob 108.

Figure 4:
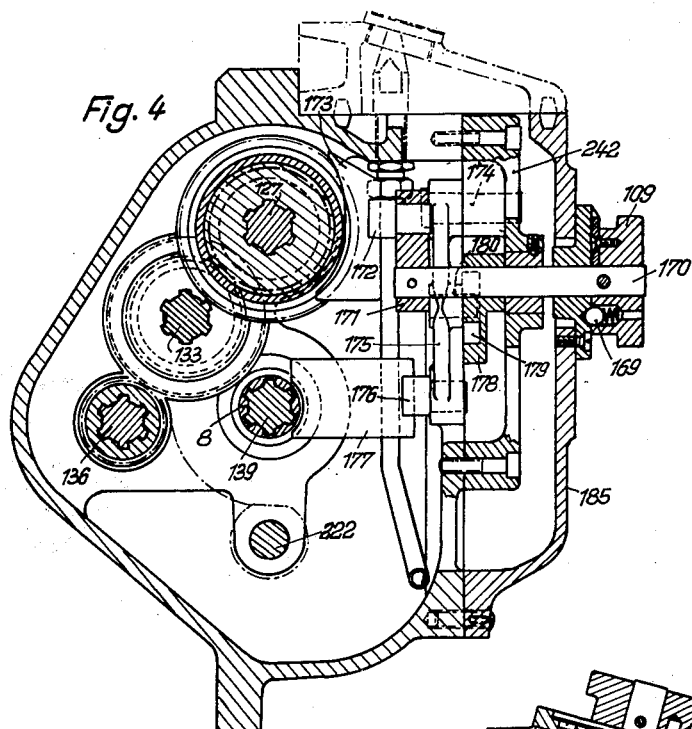
Fig. 4 is a section taken along the line 4—4 of Fig. 2.

As shown in Fig. 4, the knob 109 is retained in any one of its four positions by a spring-controlled detent ball 169. The four positions of knob 109 are individually co-ordinated to the four idle axial adjustments of the slide gear 9. The shaft 170 carrying the knob 109 is rigidly connected with a crank 171 having a crank pin 172 carrying a fork 173 engaging a peripheral groove of the slide gear 9. The shaft 170 is journalled in a bracket 242, Fig. 4, attached to the gear box 104 by suitable screws.

This setting mechanism is also operative to control the slide gear 8 in such a manner that the latter will not engage gear 157 and will not drive the lead screw 103 unless the slide gear 9 is in its idle position shown, and that gear 8 will be kept idle whenever the gear 9 assumes any of its three operative positions not shown.

For that purpose a stud 174 projecting from the bracket 242, Figs. 4 and 11, carries a depending lever 175 provided at its lower end with a hole accommodating a pivot 176 attached to a member 177 engaging a peripheral groove of the slide gear 8. On the shaft 170 there is attached a cam disk 178 having a lateral cam groove 179, Figs. 4 and 11, engaged by a follower pin 180 fixed to lever 175 intermediate its ends. When knob 109 and shaft 170 are turned the cam disk 178 will be swung and the lever 175 will be rocked, whereby the member 177 will be displaced lengthwise of shaft 139 thereby shifting the gear 8. Hence, the setting of the knob 109 will, therefore, determine both the adjustment of gear 8 and the adjustment of gear 9.

The four positions of the knob 109 are indicated in Fig. 11. From the left to the right the positions result in the following setups:

(1) The slide gear 9 assumes its uttermost left hand position and rigidly connects shafts 122 and 127.

(2) The slide gear 9 meshes with the gear 158. Actuating power is, therefore, transferred from shaft 136 via shaft 133 and gears 155, 158 to the slide gear 9 and to the lead screw for the cutting of left hand threads.

(3) The slide gears 8 and 9 are in the position shown in Fig. 2 in which the gear 8 meshes with the gear 157 on shaft 133, whereas gear 9 is disengaged and the lead screw is idle, while the feed rod 103 is actuated.

(4) The slide gear 9 meshes with the gear 157 for the cutting of right hand threads, while the gear 8 and the feed rod are idle.

For the purpose of setting the slide gears 1 to 7 the following preselecting and shifting mechanism is provided:

Two supporting plates 181 and 182 extending parallel to the walls 111 and 113, Figs. 9 and 10, are fixed to the gear box and provided with bosses 183 attached by screw 184 to the inside of the removable front plate 185 of the gear box. A splined shaft 186 extending parallel to the various transmission shafts is freely rotatably journalled in the supporting plates 181 and 182 and a helical gear 187 is attached to the right hand end of the shaft 186 in mesh with a helical gear 188 attached to the lower end of a shaft 189 carrying the knob 107, Figs. 5 and 7. An indicating dial 190 is fixed to the knob 107, such dial being provided with a scale bearing the index figures listed at the left of the table shown in Fig. 12. By means of an index mark co-operating with the scale, the operator may readily adjust the knob 107 to a position in which such index mark registers with any desired index number. By such adjustment the splined shaft 186 will be moved to a corresponding angular position.

The splined shaft 186 and certain elements attached thereto which will be described hereinafter constitute a non-shiftable part of a composite drum which also includes two axially shiftable parts connected with the non-shiftable part 186 for common rotation. Each of the two axially shiftable parts comprises five disks 191, 192, 193, 194, 195 and 196, 197, 198, 199, 200, respectively, which are kept in spaced relationship by interposed washers 201. The five spaced disks of each group are rigidly connected by rivets 202 to constitute a rigid body splined on shaft 186. The two shiftable drum parts will assume the position shown in Fig. 8 whenever all of the slidable gears 1 to 7 assume their central idle position in which the transmission is set to neutral. However, the two shiftable parts of the drum may be moved in opposite directions by upward motion of a gear shift lever 203, Figs. 1 and 11. When that happens the two shiftable drum parts will carry along certain selected slide gears, the particular selection depending on the angular position of the drum.

Figure 5:
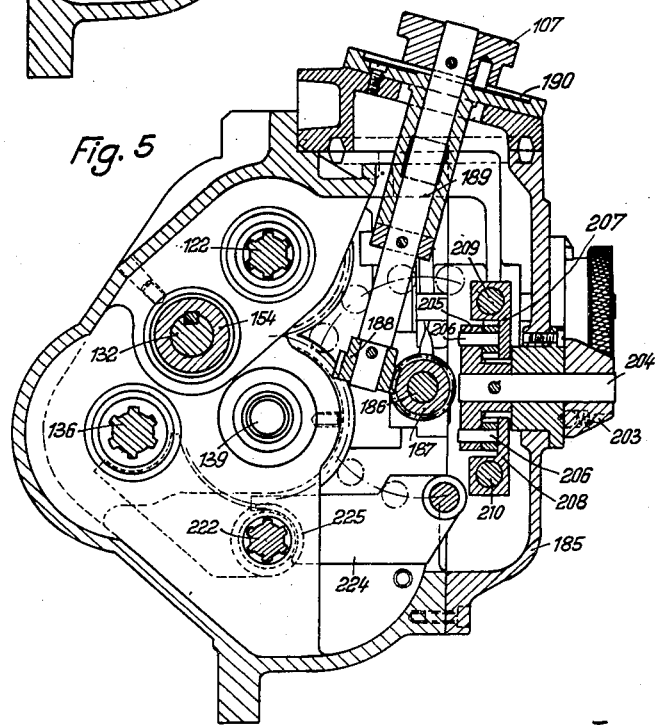
Fig. 5 is a section taken along the line 5—5 of Fig. 2.

The shaft 204, Fig. 5, of the gear shift lever 203 carries a crank member 205 rigidly attached thereto and provided with two opposite crank pins 206 positioned on either side of the axis of shaft 204. The crank pins 206 engage vertical slots of members 207 and 208 rigidly attached to rods 209 and 210, Figs. 5 and 11. These rods extend parallel to shaft 186 and are mounted in the supporting plates 181 and 182 for lengthwise displacement. When the gear shift lever 203 is rocked upwardly the crank pins will move the two rods 209 and 210 in opposite directions, rod 209 moving to the right and rod 210 to the left with reference to Fig. 8. Each of the two rods carries a laterally projecting finger 211, Figs. 8, 9 and 10, attached thereto which projects between two of the disks forming part of the shiftable drum sections and adapted to shift the same. The operator cannot turn the composite drum 186, 191 to 195, 196 to 200 unless the transmission is in the neutral position, the shiftable drum parts assuming the positions shown in Fig. 8. When they are shifted away from one another, one of a plurality of holes 212 provided in the disk 200 will engage over a locking pin 213 attached to and axially projecting from the supporting plate 181, whereby the drum will be locked against rotation. The disk 200 is provided with as many holes 212 as different angular positions may be assumed by the drum.

Circumferentially distributed about the drum shaft 186 there are mounted in the supporting plates 181 and 182 actuating rods 214 extending parallel to the various transmission shafts, each actuating rod 214 being co-ordinated to one of the slidable compound gears 1 to 7. Suitable means are provided for cooperatively connecting each of the actuating rods 214 with the associated slide gear for common shifting motion. Such means are illustrated in Figs. 2, 7 and 8 and will now be explained.

The rod 214 #I carries a plate 215 rigidly attached thereto and extending therefrom towards the shaft 122, its ends engaging a peripheral groove of the slide gear 1. Similar plates 215 and 217 are attached to the actuating rods 214 #II and #III and engage peripheral grooves of the slide gears 2 and 3 splined on the shaft 122. The actuating rod 214 #IV carries a member 218 extending towards the shaft 138 and engaging a peripheral groove of the slide gear 4. The actuating rod 214 #V has a member 219 extending towards the shaft 138 and engaging the groove of the slide gear 5.

Figure 7:
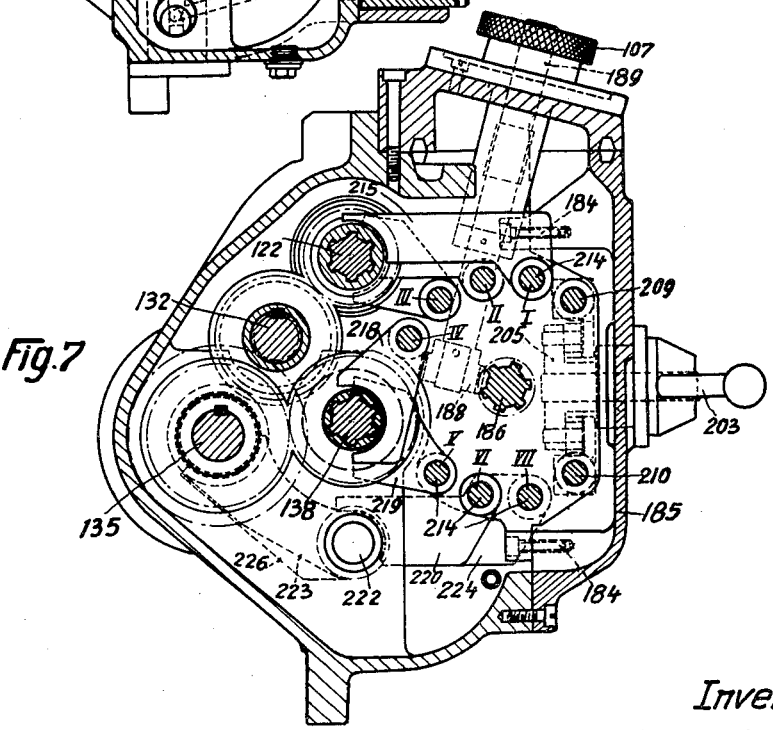
Fig. 7 is a section taken along the line 7—7 of Fig. 2.

The slide gear 6 is splined on the shaft 136 which, as shown in Fig. 7, is spaced a considerable distance from the actuating rod 214 #VI. For that reason, a plate 220 attached to the actuating rod #VI extends into a peripheral groove of a hub 221 slidably mounted on a shaft 222 shown in Fig. 8. This hub is provided with an arm 223 which projects into the peripheral groove of the slide gear 6. Similarly, the actuating rod 214 #VII is co-operatively connected with the slide gear 7 splined on shaft 136 by the intermediary of a plate 224, a hub 225 and an arm 226.

Each of the actuating rods 214 is provided with a pair of fingers fixed thereto and projecting towards the drum. Thus, Figs. 8, 9 and 10 show the pair of fingers 227 and 228 fixed to the actuating rod 214 #I. The finger 227 engages between the two disks 196 and 197 of the left part of the drum, whereas the finger 228 engages between the disks 191 and 192 of the right hand part of the drum. The peripheries of the drum disks are provided with projections adapted to selectively engage the fingers. When the left hand drum part is shifted outwardly by operation of the gear shift lever 203 it will engage and carry along the finger 227 provided that the same registers with a projection of the disk 196. Whether or not such is the case will depend on the angular position of the drum. Thus, it is the adjustment by the knob 107 which is instrumental in determining whether the gear shifting motion by lever 203 causes the finger 227 to be shifted to the left or causes the finger 228 to be shifted to the right, or will leave both fingers unaffected in their resting positions. To securely hold all those slide gears in neutral position which are not selected for a shifting motion by the angular adjustment of the drum, the non-shiftable part 186 of the drum includes means fixed thereto which will engage the shiftable members that are connected with the slide gears.

To this end, each of the actuating rods 214 #I, II and III carries an arm 229 pinned to the middle of the actuating rod and extending towards the shaft 186, the end face of such arm being provided with a recess engaging over a disk 230 mounted on and fixed to the middle of the shaft 186 so as to form part of the nonshiftable drum section. The periphery of the disk 230 is provided with recesses which are so disposed as to release the arms 229 attached to such actuating rods 214 as are selected for displacement. In other words, the disk 230 is adapted in such angular positions to release the members 229 in which the associated actuating rods will be shifted to the right or to the left.

The actuating rods 214 #IV and V are similarly locked in neutral position by locking disks 231 and 232 attached to the ends of shaft 186 outside of the supporting plates 181 and 182. For this purpose, the actuating rods 214 #IV and V have recesses 233 and 234 engaged by projections or teeth of such locking disks 232.

The actuating rods 214 #VI and VII will be shifted in any gear shifting operation and, therefore, need not be locked in neutral.

Just as the actuating rod 214 #I has a pair of fingers 227 and 228, each of the other rods 214 has a similar pair of fingers, the fingers 243 and 244 of the rods #II and #III being disposed in the same plane as the fingers 227 and 228 for displacemnt by the disks 191 and 196. When the shifting lever 203 is restored, those fingers will be returned to their normal positions by the disks 192 and 197.

One of the pair of fingers 235 fixed to the rod 214 #IV engages between the actuating disks 192 and 193, while the other one of the pairs of fingers 235 engages between the disks 197 and 198. Similarly, the pair of fingers 236 of actuating rod 214 #V engages between the disks 198 and 199, and between the disks 193 and 194 respectively. The pair of fingers 237 of the actuating rod 214 #VI engages between the disks 194 and 195, and the disks 199 and 200 respectively.

The pair of fingers 238 fixed to the actuating rod 214 #VII is disposed outside of the disks 195 and 200. In order to cause the actuating rod 214 #VII to be restored to normal, notwithstanding such outer positions of the fingers, the rod is provided with a second pair of fingers 239 disposed inside of and adjacent to the disks 195 and 200.

In Fig. 12 the cross-hatched fields in the column 240 designate such actuatings rods and slide gears as will be shifted to the left in the gear shifting operation performed by upward actuating of the gear shift lever 203. In the column 241 in cross-hatched fields designate such actuating rods 214 and slide gears as well be shifted to the right upon a gear shifting operation performed by upward actuation of gear shift lever 203. The following columns contain information regarding the ratio of transmission set up in the basic transmission and in the additional train of gears.

The table of Fig. 12 will now be explained by way of an example, same being the adjustment of the knob 107 to position #10: When the knob is turned so that its dial #10 registers with the reading mark, the subsequent operation of the gear shift lever 203 will result in a displacement of the slide gears 2 and 7 to the left and of the slide gears 4 and 6 to the right. When knob 108 is set to the English system-position, as indicated in Fig. 11, a thread of 22 turns per inch may be cut and for that purpose the lead screw will be driven via the following gears: 116, 142, 143, 4, 145, 148, 149, 10, 2, 152, 17, 6, 7, 155. The further route of the power transmission depends on the adjustment of the knob 108 determining the hand of the thread to be cut.

As a result the following ratio of transmission will be set up between the ingoing shaft 115 and the lead screw 102:

$$\frac{65 \cdot 49 \cdot 36}{61 \cdot 55 \cdot 37} \cdot \frac{20 \cdot 17 \cdot 32 \cdot 32}{24 \cdot 68 \cdot 32 \cdot 32}$$

This fraction can be converted to:

$$\frac{9 \cdot 10 \cdot 14 \cdot 49}{61 \cdot 37} \cdot \frac{1}{132} = 25.400974 \cdot \frac{1}{132}$$

It may be mentioned that the accurate length of the English inch at a temperature of 20° C. amounts to 25.40097366 mm.

Let it be further assumed that the ingoing shaft 115 is geared to the work spindle 106 at the ratio of 1:1 and therefore, performs one revolution for any revolution of the work piece, and that the lead screw 102 has a lead of 6 mm. Hence, for one revolution of the ingoing shaft 115 and of the work spindle 106, the feed of carriage 101 amounts to:

$$25.400974 \cdot \frac{1}{132} \cdot 6 \text{ mm.}$$

For twenty-two revolutions of the work piece the feed of carriage 101 amounts to:

$$25.400974 \cdot \frac{1}{133} \cdot 6 \cdot 22 \text{ mm.} = 1''$$

Hence, it will appear that the thread cut into the work piece will have twenty-two threads per inch.

When the shiftable gear 10 is moved to the left with reference to Fig. 2 by appropriate manipulation of knob 108, motion will be transmitted through the pairs of gears 2 and 152, 154 and 6, 7 and 155, 157 and 9. Such transmission results in the following ratio between the ingoing shaft 115 and the lead screw 102:

$$\frac{20 \cdot 17 \cdot 32 \cdot 32}{24 \cdot 68 \cdot 32 \cdot 32} = \frac{5}{24}$$

One revolution of the lead screw and the ingoing shaft 115 thus results in 5/24 revolutions of the lead screw, that is to say to a longitudinal feed of:

$$6\frac{5}{24} \text{ mm.} = 1.25 \text{ mm.}$$

Similar calculations for the other settings listed in Fig. 12 differ from the above example by the ratios between shafts 138 and 135, such ratios being listed in columns 4 and 5 of Fig. 12, and by the ratios between shafts 122 and 132 listed in columns 1, 2 and 3, and by the ratios between shafts 132 and 136 and shafts 136 and 133 listed in columns 6 and 7. As a matter of principle the following is to be understood: In order to convert the basic series of the metric pitches of 14, 12, 11, 10, 9, 8 millimeters into the basic series of the pitches of the English system $$\frac{1''}{2}, \frac{1''}{2.25}, \frac{1''}{2.375}, \frac{1''}{2.5}, \frac{1''}{2.75}, \frac{1''}{3}, \frac{1''}{3.5}$$

the following additional transmission ratio must be set up:

$$14\frac{127}{140} = 14\frac{5''}{140} = \frac{1''}{2} = 2 \text{ turns per } 1''$$

$$12\frac{127}{135} = 12\frac{5''}{135} = \frac{1''}{2.25} = 2\frac{1}{4} \text{ turns per } 1''$$

$$12\frac{127}{142.5} = 12\frac{5''}{142.5} = \frac{1''}{2.375} = 2\frac{3}{8} \text{ turns per } 1''$$

$$11\frac{127}{137.5} = 11\frac{5''}{137.5} = \frac{1''}{2.5} = 2\frac{1}{2} \text{ turns per } 1''$$

$$10\frac{127}{137.5} = 10\frac{5''}{137.5} = \frac{1''}{2.75} = 2\frac{3}{4} \text{ turns per } 1''$$

$$9\frac{127}{135} = 9\frac{5''}{135} = \frac{1''}{3} = 3 \text{ turns per } 1''$$

$$8\frac{127}{140} = 8\frac{5''}{140} = \frac{1''}{3.5} = 3\frac{1}{2} \text{ turns per } 1''$$

The quotients included in the above equations may be converted as follows:

$$\frac{127}{140} = \frac{127}{135} \cdot \frac{54}{56}$$

$$\frac{127}{135} = \frac{127}{135} \cdot \frac{54}{54}$$

$$\frac{127}{137.5} = \frac{127}{135} \cdot \frac{54}{55}$$

$$\frac{127}{142.5} = \frac{127}{135} \cdot \frac{54}{57}$$

The constant ratio $$\frac{127}{135}$$

millimeters may be written $$\frac{5''}{135}$$

one inch equalling 25.4 millimeters. The accurate length of the English inch, however, amounts to 25.40097366 millimeters. That figure may be expressed with great accuracy by the quotient $$\frac{9 \cdot 10 \cdot 13 \cdot 49}{37 \cdot 61} = 25.40097474 \text{ mm}$$

Such quotient representing the ratio of the English system of measurement to the metric system. With this quotient and with the ratio $$\frac{127}{135} = \frac{5''}{135}$$

the following equation may be stated:

$$\frac{5''}{135} = \frac{5'' \cdot 9 \cdot 10 \cdot 13 \cdot 49}{37 \cdot 61 \cdot 135} = \frac{130 \cdot 49}{111 \cdot 61} = k$$

Since the quotient $$\frac{9 \cdot 10 \cdot 13 \cdot 49}{37 \cdot 61}$$

differs from the accurate value of the inch expressed in millimeters only at the sixth decimal denomination, it will appear that the transmission ratio $$k = \frac{130 \cdot 49}{111 \cdot 71}$$

will result in the cutting of very accurate threads of the English system, same being much more accurate than threads obtained with the ratio $$\frac{127}{135}$$

The above described embodiment is capable of numerous modifications.

While I have described my invention with reference to a preferred embodiment thereof, I wish it to be clearly understood that same is capable of numerous modifications within the scope of the appended claims.

The term "feed spindle" used in some of the claims is intended to cover either one, the lead screw 102 and the feed rod 103.

What I claim is:

1. In a speed change transmission including a plurality of members individually shiftable along parallel axes, the combination comprising a rotary drum mounted to be rotatable about an axis parallel to said axes and composed of a non-shiftable part and of two axially shiftable parts connected with said non-shiftable part for common rotation, said non-shiftable part of said drum having means fixed thereto adapted, depending on the angular position of said drum, to engage or disengage said shiftable members, and projections on said shiftable parts of said drum adapted to selectively engage such members as are released for shifting motion, and means co-ordinated to said shiftable parts of said drum and co-operatively connected therewith for shifting same to thereby shift said released members.

2. In a speed change transmission including a plurality of members individually shiftable along parallel axes from an intermediate idle position to one or the other of two operative end positions, the combination comprising a rotary drum, means for mounting said drum to be rotatable about an axis parallel to said axes, said drum being composed of a non-shiftable part and of two axially shiftable parts connected with said non-shiftable part for common rotation, means for shifting said shiftable parts in opposite directions including a handle, means fixed to said non-shiftable part of said drum co-ordinated to said members and adapted, depending on the angular position of said drum, to lock said members in said intermediate idle position or to release said members, projecting means on said shiftable parts of said drum co-ordinated to said members and adapted to selectively engage such of said members as are released for shifting same to one of said end positions, and a rotatable handle co-operatively connected with said drum for common rotation therewith.

3. In a speed change transmission including a plurality of members individually shiftable along parallel axes, the combination comprising a rotary drum mounted to be rotatable about an axis parallel to said axes and composed of a non-shiftable part and of two axially shiftable parts connected with said non-shiftable part for common rotation, a plurality of shiftable rods extending parallel to said drum and distributed thereabout, each of said rods being co-ordinated to one of said members and connected therewith for common shifting motion, means fixed to said non-shiftable part of said drum and adapted, depending on the angular position of same, to engage or disengage said rods, projections on said shiftable parts of said drum adapted to selectively engage such rods as are released for shifting motion, and means co-ordinated to said shiftable parts of said drum and co-operatively connected therewith for shifting same to thereby shift said released rods.

4. In a speed change transmission including a plurality of members individually shiftable along parallel axes, the combination comprising a rotary drum mounted to be rotatable about an axis parallel to said axes and composed of a non-shiftable part and of two axially shiftable parts connected with said non-shiftable part for common rotation, means for shifting said axially shiftable parts of said drum in opposite directions, a plurality of rods distributed about said drum and mounted for lengthwise shifting motion in either direction, means fixed to said non-shiftable part of said drum and adapted, depending on the angular position of same, to engage and to lock certain elected ones of said rods and to disengage the other rods, means for rotating said drum to thereby elect the rods to be disengaged, and means fixed on said axially shiftable parts of said drum and adapted to selectively engage such of said rods as are released for shifting motion.

5. The combination claimed in claim 4 in which said means for shifting said axially shiftable parts of said drum comprise a pivotal handle, two crank pins connected therewith on opposite sides of the pivotal axis of said handle, and means individually connecting said crank pins with said shiftable parts of said drum.

6. The combination claimed in claim 1 combined with stationary locking means mounted within the path of one of said shiftable parts of said drum and adapted to engage and to lock same against rotation when said shiftable parts have been shifted for engagement of their projections with said members.

7. The combination claimed in claim 1 in which the nonshiftable part of said drum comprises a splined shaft and the two axially shiftable parts of said drum comprise a stack of toothed disks, the teeth thereof constituting said projections.

8. In a lathe of the character described, the combination comprising a feed transmission having a primary shaft, a reversing gear, a lead screw, a feed rod, a handle movable to any one of four different positions, means operable by said handle and co-ordinated to said lead screw, said feed rod, said primary shaft and said reversing gear and adapted in the first position thereof to directly connect said screw to said primary shaft, in a second position thereof to connect said feed transmission to said lead screw via said reversing gear, in a third position thereof to connect said feed rod to said feed transmission disconnecting said lead screw therefrom, and in the fourth position to directly connect said feed transmission to said lead screw.

9. The combination claimed in claim 8 in which said means operable by said handle comprise a shaft connected to and rotatable by said handle, a cam connected thereto, gear shifting means operable by said cam, a crank pin fixed to said shaft in offset position relative thereto, and additional gear shifting means operable by said crank pin.

References Cited in the file of this patent

UNITED STATES PATENTS

| | | |
|---|---|---|
| 759,151 | Barber | Jan. 12, 1904 |
| 1,502,701 | Von Soden-Fraunhofen | July 29, 1924 |
| 1,545,052 | Ingham | July 7, 1925 |
| 1,687,721 | Glosh | Oct. 16, 1928 |
| 2,149,014 | Fritzsch | Feb. 28, 1939 |
| 2,572,759 | Ritter | Oct. 23, 1951 |

FOREIGN PATENTS

| | | |
|---|---|---|
| 559,326 | Germany | Sept. 1, 1932 |